R. R. ODELL.
ARTIFICIAL BAIT.
APPLICATION FILED APR. 14, 1919.
1,338,953.
Patented May 4, 1920.
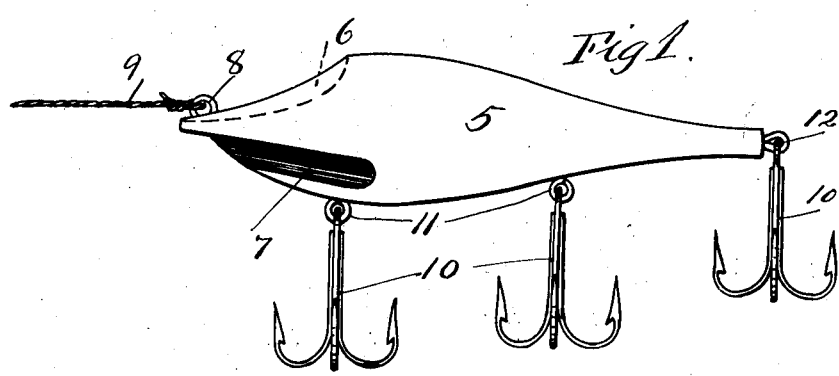
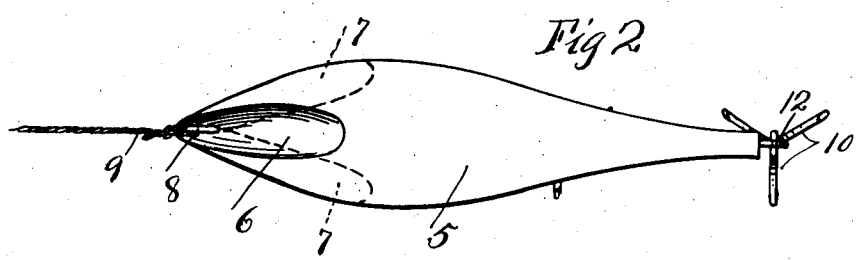
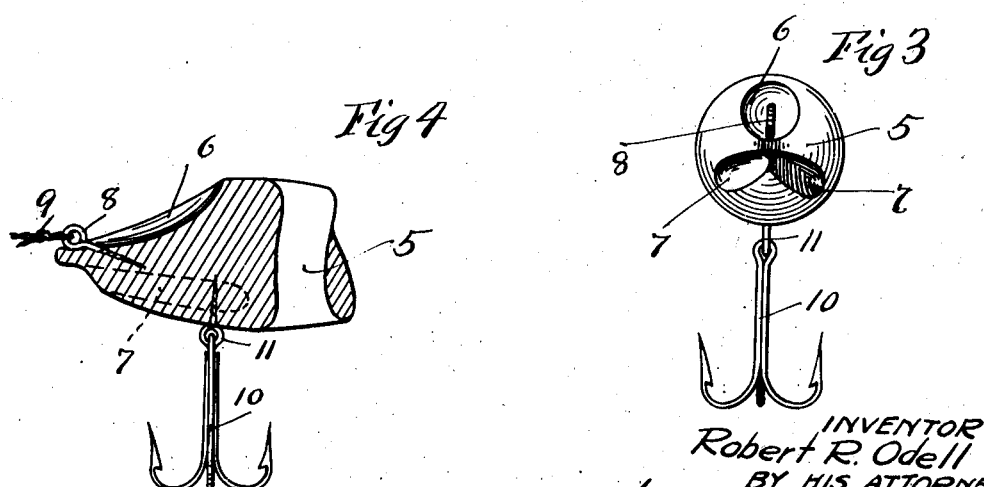
INVENTOR
Robert R. Odell
BY HIS ATTORNEYS

UNITED STATES PATENT OFFICE.

ROBERT R. ODELL, OF MINNEAPOLIS, MINNESOTA.

ARTIFICIAL BAIT.

1,338,953.   Specification of Letters Patent.   Patented May 4, 1920.

Application filed April 14, 1919. Serial No. 289,818.

*To all whom it may concern:*

Be it known that I, ROBERT R. ODELL, a citizen of the United States, residing at Minneapolis, in the county of Hennepin and State of Minnesota, have invented certain new and useful Improvements in Artificial Bait; and I do hereby declare the following to be a full, clear, and exact description of the invention, such as will enable others skilled in the art to which it appertains to make and use the same.

My invention relates to that type of artificial fish bait generally known as wabblers, and which are usually made in more or less close imitation of a minnow. Hitherto, however, such artificial bait has not been made to approximate a minnow in appearance nor to imitate all of the movements of a minnow in the water.

My improved artificial bait, in the first place, is made to look very much like a minnow or small fish and in the second place, it is so constructed that it will not only wabble, but, at will, can be made to dive or come to the surface.

My improved artificial bait is illustrated in the accompanying drawings wherein like characters indicate like parts throughout the several views.

Referring to the drawings;

Figure 1 is a side elevation of the improved bait;

Fig. 2 is a plan view thereof;

Fig. 3 is a front end elevation of the bait; and

Fig. 4 is a fragmentary view of the front portion of the bait partly in vertical axial section and partly in side elevation.

The body 5 of the bait may be made solid of wood or may be made hollow of sheet metal or any other suitable material or substance that will float, or which, in other words, is lighter than water.

The said body 5 is made very much in the shape of a minnow or small fish, and at its relatively blunt tapered front end, it is formed with three longitudinal grooves 6, 7, 7. The groove 6 is located in the top of the body 5, extends in the axial vertical plane of said body, and is not only concave in cross section but is concave in longitudinal section, so that its bottom has a longitudinal curve that turns quite abruptly up to a point where it reaches the top of the bait at approximately the largest diameter of the body. The grooves 7 are located, one on each side and extend from the front of the bait to the thick portion of the body where they terminate in abruptly out-turned surfaces. Preferably, the said side grooves 7 have a downward inclination. These grooves 7 appear to form the mouth of the minnow or small fish and add to the approximation, in appearance, of the bait to a minnow, but the main function is to produce a wabbling of the bait and, in connection with the top groove 6, to cause the bait to dive when the bait is given a sudden quick forward jerk. It will be noted that the grooves 7 come together at the underside of the head of the bait and at a point rearward of a forwardly projecting ledge formed by an extension of the upper lines of the grooves 7. This gives the bait much the appearance of a shark's mouth or head and the projecting ledge greatly assists in producing the diving action. It is of obvious importance that these grooves 7 come together or run out rearward of the forwardly projected nose or ledge of the bait. The curved groove 6 located on the top of the head of the bait assists in producing the diving action when the bait is suddenly jerked forward.

At its front end, the bait body 5 is provided with an eye 8 to which the line 9 is attached. Multi-pronged fish hooks 10 are attached to the bait, two thereof being shown as attached to eyes 11 on the bottom of the bait and one thereof being shown as attached to an eye 12 at the rear or tail end of the bait.

When this bait is drawn forward, the water will be caused to eddy through the grooves 6, 7—7, and this, under ordinary forward movement, will produce a wabbling of the bait closely approximating the movements of a minnow or fish. When the bait is given a very quick forward movement or jerk, the resistance caused by the water eddying in the grooves 7 and the downward deflection produced by the water eddying in the upper groove 6 will, as has been repeatedly demonstrated in practice, cause the bait to immediately make a downward dive, the depth of which it will dive being dependent on the suddenness or intensity of the forward jerk or movement. These movements of the bait which will imitate all the movements of a minnow or fish, and the further fact that the bait has a close appearance of a minnow or fish, make such bait very efficient for the catching of fish, and more especially for catching large fish.

It is important to note that the lower grooves 7 diverge rearwardly and at their front extremities are joined at a sharp edge. In this arrangement, the grooves have the appearance of a shark's mouth, but their divergence from the sharp edge causes the lower portion of the bait to cut readily through the water and to produce a sidewise wabbling action. Also it should be noted that the sharp edge at the junction of the two lower grooves 7 is located slightly rearward of the extreme front end of the body 5.

What I claim is:

An artificial bait comprising a hook-equipped body tapered in both directions from an intermediate point, said body, at its tapered head, having a centrally located groove that is curved in a vertical plane and extends to the nose of the bait, and having a forwardly projecting nose, and immediately below the plane of the undersurface of said nose, forwardly converging side grooves that meet and run out at a point rearward of the point of the nose of the said body, and the said body, at its nose or front end having means for attachment of a line thereto.

In testimony whereof I affix my signature in presence of two witnesses.

ROBERT R. ODELL.

Witnesses:
F. H. STRUCHFIELD,
JAMES G. SWAN.